(12) United States Patent
Bauer

(10) Patent No.: US 10,709,295 B2
(45) Date of Patent: Jul. 14, 2020

(54) DRYING STORAGE UNIT

(71) Applicant: Chris Bauer, Casper, WY (US)

(72) Inventor: Chris Bauer, Casper, WY (US)

( * ) Notice: Subject to any disclaimer, the term of this patent is extended or adjusted under 35 U.S.C. 154(b) by 0 days.

(21) Appl. No.: 16/045,655

(22) Filed: Jul. 25, 2018

(65) Prior Publication Data
US 2019/0029473 A1 Jan. 31, 2019

Related U.S. Application Data

(60) Provisional application No. 62/536,539, filed on Jul. 25, 2017.

(51) Int. Cl.
*A47J 47/16* (2006.01)
*A47L 15/00* (2006.01)
*A47L 19/04* (2006.01)
*A47B 61/02* (2006.01)
*A47B 81/02* (2006.01)
*A47B 77/00* (2006.01)
*A47B 79/00* (2006.01)
*A47B 3/00* (2006.01)
*A47B 73/00* (2006.01)

(52) U.S. Cl.
CPC ............. *A47J 47/16* (2013.01); *A47B 61/02* (2013.01); *A47B 73/008* (2013.01); *A47B 77/00* (2013.01); *A47B 79/00* (2013.01); *A47B 81/02* (2013.01); *A47L 15/0013* (2013.01); *A47L 19/04* (2013.01)

(58) Field of Classification Search
CPC ....... A47J 47/16; A47J 47/20; A47L 15/0013; A47L 19/04; A47B 77/00; A47B 79/00; A47B 61/02; A47B 61/003; A47B 61/00; A47B 73/008; A47B 73/00; A47B 71/00; A47B 75/00; A47B 67/00; A47B 81/00; A47B 81/02; A47B 81/04; A47B 69/00; A47B 46/00; A47B 43/00
USPC .............. 211/41.3, 87.01; 312/213, 229, 351
See application file for complete search history.

(56) References Cited

U.S. PATENT DOCUMENTS

| | | | | |
|---|---|---|---|---|
| 132,998 | A * | 11/1872 | Yaw ....................... | A47B 81/00 312/290 |
| 1,069,411 | A * | 8/1913 | Greene ................... | A47B 71/00 126/20 |
| 1,346,781 | A * | 7/1920 | Chavannes ............... | F26B 9/06 34/197 |
| 1,566,545 | A * | 12/1925 | Larson ...................... | A47F 1/03 209/259 |
| 1,573,466 | A * | 2/1926 | Ward ..................... | A47B 71/00 312/290 |
| 1,798,800 | A * | 3/1931 | MacKnight ............ | A47B 67/00 12/123 |
| 2,091,746 | A * | 8/1937 | Wiley ..................... | F24C 15/12 126/19 M |

(Continued)

*Primary Examiner* — Jennifer E. Novosad
(74) *Attorney, Agent, or Firm* — IPS Legal Group, P.A.

(57) ABSTRACT

A drying storage unit is disclosed to enable a user to properly dry a high-use item in a convenient location. The dry storage unit comprising at a cabinet-style storage and the cabinet style storage compartment comprises a top side, a left side, a right side, a bottom side, at least one door open outwardly that is hingedly attached to left side and right side, an inner compartment and a plurality of able shelving brackets disposed along the right, left, and rear walls of the inner compartment. The dry storage unit further comprises more than one adjustable drying rack and a plurality of pole racks.

4 Claims, 5 Drawing Sheets

(56) References Cited

U.S. PATENT DOCUMENTS

| | | | | |
|---|---|---|---|---|
| 2,230,975 A * | 2/1941 | Gratz | A47B 69/00 | 108/28 |
| 2,440,549 A * | 4/1948 | Kiser | A47B 61/02 | 211/99 |
| 2,584,089 A * | 1/1952 | Hillenbrand | A47B 79/00 | 312/213 |
| 3,131,011 A * | 4/1964 | Rittenberry | A47B 69/00 | 108/28 |
| 3,164,431 A * | 1/1965 | Black | A47B 79/00 | 312/282 |
| 3,519,318 A * | 7/1970 | Hagen | A47B 43/04 | 312/213 |
| 3,661,435 A * | 5/1972 | Miller | A47B 61/00 | 312/223.5 |
| 3,717,398 A * | 2/1973 | Deane et al. | A47B 79/00 | 312/283 |
| 3,860,307 A * | 1/1975 | Fostel | A47B 11/00 | 312/249.4 |
| 3,897,122 A * | 7/1975 | McEvers | A47B 61/02 | 211/85.3 |
| 4,084,867 A * | 4/1978 | Putt | A47B 61/02 | 211/34 |
| 4,682,424 A * | 7/1987 | Irving | D06F 58/10 | 211/123 |
| 4,753,495 A * | 6/1988 | Swink | A47F 5/02 | 211/163 |
| 4,906,058 A * | 3/1990 | Turner | A47B 81/02 | 15/323 |
| 5,305,484 A * | 4/1994 | Fitzpatrick | D06F 73/02 | 223/70 |
| 5,350,304 A * | 9/1994 | Fula | A63H 33/12 | 312/213 |
| 5,555,640 A * | 9/1996 | Ou | A47L 19/00 | 211/133.6 |
| 5,577,819 A * | 11/1996 | Olsen | A47B 67/00 | 312/209 |
| 5,647,651 A * | 7/1997 | Kim | A47B 67/00 | 312/209 |
| 6,513,889 B1 * | 2/2003 | Park | A47B 81/02 | 312/206 |
| 9,254,050 B1 * | 2/2016 | Bradbury | A47F 7/0064 | |
| 2004/0140744 A1 * | 7/2004 | Kalieta | A47B 69/00 | 312/326 |
| 2004/0232092 A1 * | 11/2004 | Cash | A47B 73/008 | 211/4 |
| 2005/0258118 A1 * | 11/2005 | Lee | A47B 55/02 | 211/134 |
| 2006/0076859 A1 * | 4/2006 | Slappey | A47B 61/00 | 312/311 |
| 2006/0138063 A1 * | 6/2006 | Johnson | A47L 19/04 | 211/41.3 |
| 2006/0220502 A1 * | 10/2006 | Williams | A47B 61/02 | 312/108 |
| 2008/0136295 A1 * | 6/2008 | Aizpuru Borda | D06F 58/10 | 312/31 |
| 2008/0169251 A1 * | 7/2008 | Smith | A47B 67/00 | 211/26 |
| 2010/0059460 A1 * | 3/2010 | Mulaw | A47L 19/04 | 211/41.3 |
| 2013/0119850 A1 * | 5/2013 | Breyburg | A47B 71/00 | 312/408 |
| 2014/0048500 A1 * | 2/2014 | Brookes | A47B 57/10 | 211/74 |
| 2015/0113825 A1 * | 4/2015 | Goulet | D06F 58/10 | 34/443 |
| 2015/0182076 A1 * | 7/2015 | Berke | A47K 3/281 | 312/209 |
| 2016/0166059 A1 * | 6/2016 | Zohar | A47B 81/02 | 312/257.1 |
| 2018/0255892 A1 * | 9/2018 | Cardenas | A47B 61/003 | |
| 2019/0029473 A1 * | 1/2019 | Bauer | A47J 47/16 | |

\* cited by examiner

DRYING STORAGE UNIT

CROSS-REFERENCE TO RELATED APPLICATION

This application claims priority to U.S. Provisional Application No. 62/536,539 filed on Jul. 25, 2017, the disclosure of which, including any materials incorporated by reference therein, is incorporated herein by reference in its entirety.

TECHNICAL FIELD

The present invention relates generally to dish storage. More particularly, the present invention concerns a drying storage unit for kitchen utensils and similar items.

BACKGROUND

In an environment where dishware, cookware, silverware, and other such items are used frequently, such as in a personal or commercial kitchen, some items tend to be used more often than others. Such items are often washed, dried, then used again almost immediately. To properly put away such an item is a waste of time, as it will need to be gotten right back out again. Consequently, many persons set such items on the countertop to dry so it will be easily within reach when needed again. However, in such circumstances, the person is often forced to set the item on a makeshift drying area, such as a few paper towels, because a proper dish drying rack would not fit in the space available. Therefore, what is needed is a space-saving drying rack device that can accommodate smaller items that are used frequently.

Attempts have been made, although unsuccessfully, to meet this need. One illustrative attempt can be seen with respect to U.S. Patent Application Publication No. 2010/0059460, which generally discloses a countertop dish rack with a removable grate. While this disclosure does provide for a dish drying device that would fit in a small space, its lack of enclosed drying space could expose the dishes to flying water or debris from dishwashing nearby.

Another attempt can be seen with respect to U.S. Patent Application Publication No. 2006/0138063, which generally discloses a dish rack mounted above a sink. While this disclosure does provide for a space-saving option, the fact that the water would drip onto one's hands while one was working in the sink seems less than ideal. Additionally, this disclosure is not enclosed either.

As can be seen, various attempts have been made to solve the problems which may be found in the related art but have been unsuccessful. A need exists for a new small enclosed drying rack for high-use items to avoid the challenges and problems with the prior art.

Thus, various attempts have been made to solve the problems which may be found in the related art but have been unsuccessful. A need exists for a drying system for kitchen utensils and similar items.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as storage, dish, utensils, racks etc., are herein meant to include or encompass all equivalents for such elements. For example, in addition to a "rack", any flat surface capable of holding items that need to be laid out to dry are also contemplated by the present invention. Moreover, while the invention will be described in connection with drying kitchen utensils and similar items, it is understood that the invention is not limited in scope to use with kitchen items but may be used with other items reasonably likely to benefit from being housed or drying in a storage unit. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a novel solution for drying high-use items. The general purpose of the present invention, which shall be described subsequently in greater detail, is to enable a user to properly dry high-use items in a convenient location. The features of the invention are believed to be novel and to have been particularly pointed out and distinctly claimed in the concluding portion of the specification. These and other features, aspects, and advantages of the present invention will become better understood with reference to the following drawing and detailed description.

The features of the invention which are believed to be novel are particularly pointed out and distinctly claimed in the concluding portion of the specification. By way of non-limiting example, the present invention provides a novel solution for drying high-use items. These and other features, aspects, and advantages of the present invention will become better understood with reference to the following drawings and detailed description.

The present invention comprises a small, enclosed drying rack for high-use items. In some embodiments, the present invention may provide for a multi-tier storage caddy for dishes. In some embodiments, the present invention is a caddy that is meant to be kept on display and on a counter. In some embodiments, the present invention may be much smaller than the traditional sizes available currently.

In greater detail, the present invention is multi-tier dish rack/storage caddy that is much smaller than traditional dish racks. It is enclosed in a solid sided box and is meant to be left on the counter top. The main purpose of this dish rack is for air drying and storing smaller items used all the time. Some examples are the cups/mugs/lids/blades for appliances such as Magic Bullet®, NutriBullet® and Ninja®; as well as everyday items like coffee cups and mugs, sipper cups, travel coffee cups, etc.

The present invention is unique in that it is geared towards smaller items rather than all dishes such as plates and bigger items typically put into bigger dish racks. It can also be used as an all-around storage caddy. The drying racks are a two-piece design so that the top platform can be removed and the bottom platform can be used to put items on when not being used as a drying tray.

The present invention will be in an enclosed box so it is more visually appealing than traditional dish racks. The dishes will be placed on grates. Directly below the grates will be a bin for inserting a drying mat or paper towels for catching water. This way the present invention unit doesn't have to be next to sink for draining. The trays will be adjustable in the enclosure so they can be adjusted up or down for more customized compartments. For example, the bottom section could be 10" for cups and taller items. The top section could be only 4" for lids, cutters, etc. When used as a storage caddy or even a combination of a dish rack and a storage caddy, the present invention provides a convenient location for things used all the time. If items have previously just been left out on the counter top, such as a coffee canister/filters now they can be put away. Or if these things are now in a cupboard they can now be in a more convenient location and now that cupboard space is available for other things.

The present invention is a dish rack geared towards smaller items used daily or several times a day. These items are quickly washed then placed inside for air drying and storage. This footprint would be similar in size to two large cereal boxes sitting back to back on the counter. The dish rack is enclosed in a plastic "box" with hinged doors on the front for access. This invention is more convenient than bigger bulky dish racks that take up a lot of counter space and typically need to sit next to a sink for draining.

The enclosure will be solid plastic or metal on top and sides. The front will have hinged doors opening in a similar manner to kitchen counter doors. The doors might even be optional if it is preferred to not have them on. The back panel will most likely be slotted to some extent for moisture to escape and not have a buildup of moisture inside the unit from evaporation. The drying trays will be adjustable up or down for customized sizing. The grates will be removable for easy periodic cleaning.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood to that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

FIG. 6 shows a close-un perspective view of a preferred embodiment of a drying storage rack in accordance with an embodiment of the invention.

DETAILED DESCRIPTION

The present invention overcomes the limitations of the prior art by providing a new and more effective drying system for kitchen utensils and similar items.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising," "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
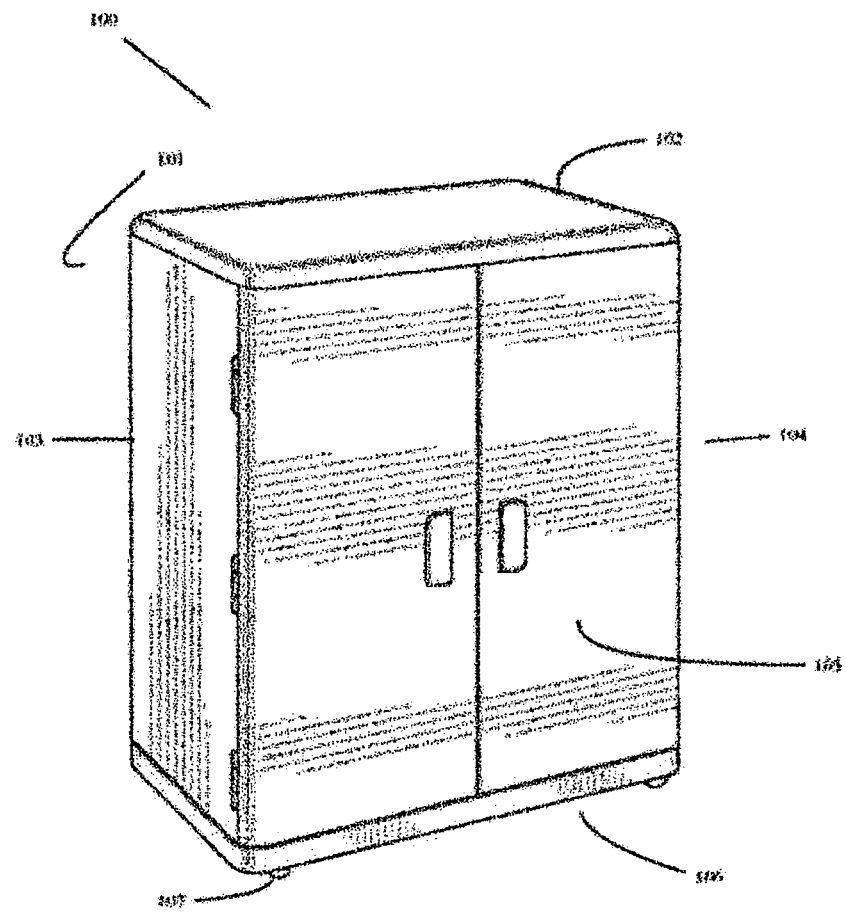
FIG. 1 shows a front perspective view of a drying storage rack in accordance with an embodiment of the invention.

Turning attention to FIG. 1, a front perspective view of a drying storage rack in accordance with an embodiment of the invention in a closed position is shown. In the embodiment depicted, a viewer may perceive a drying storage rack 100, encased in a cabinet-style housing 101, having a top 102, a left side 103, a right side 104, and two doors 105, that open outwardly that are attached to the left side 103 and right side 104 of the cabinet-style housing 100.

In the embodiment disclosed in FIG. 1, the drying storage rack 100, here shown has a bottom 106 that rests above the floor and may rest on short legs 107 or an elevated platform. A viewer will note that the cabinet-style housing 101 in this position allows for water to escape the bottom 106 of the drying storage rack 100.

Figure 2:
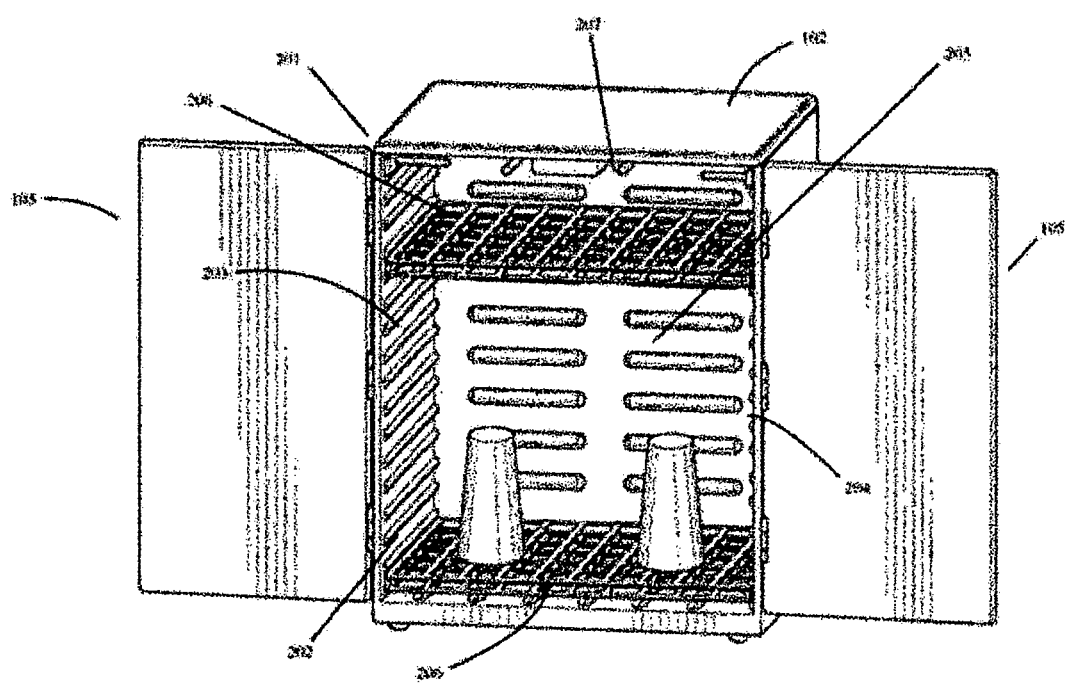
FIG. 2 shows a perspective view of an embodiment of a drying storage rack in accordance with an embodiment of the invention.

With respect to FIG. 2, a perspective view of an embodiment of the drying storage rack 100 in accordance with an embodiment of the invention is shown. In the embodiment depicted, a viewer may perceive the inner compartment 201 of the drying storage rack 100, having a plurality adjustable shelving brackets 202 on the left side 203, right side 204, and rear 205 of the inner compartment 201.

Figure 4A:
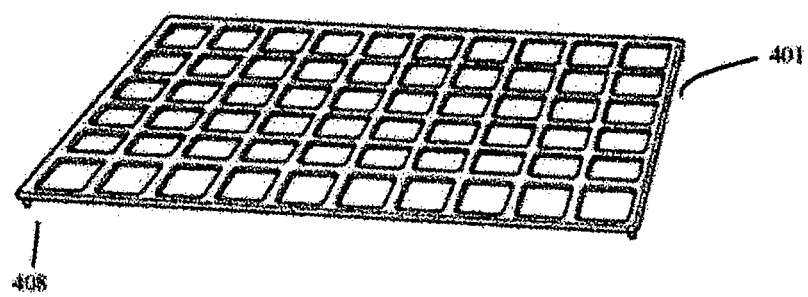
FIG. 4a shows a top member of a preferred embodiment of a drying storage rack in accordance with an embodiment of the invention.
Figure 4B:
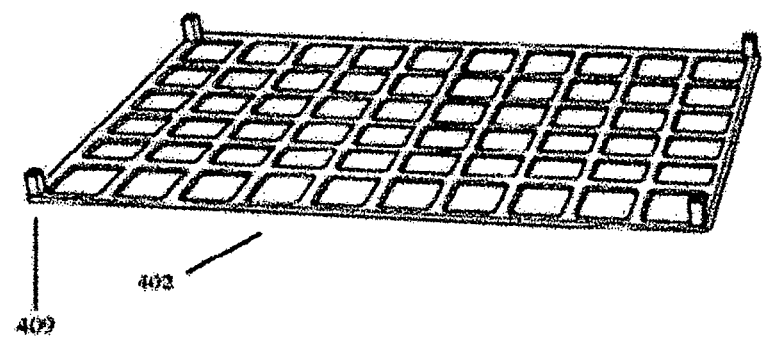
FIG. 4b shows a bottom view-member of a preferred embodiment of a drying storage rack in accordance with an embodiment of the invention.

Turning attention to FIGS. 4a & 4b, a close-up perspective view of the top and bottom member of drying racks 206 in accordance with an embodiment of the invention are shown. In the embodiment depicted, a viewer may perceive that the drying rack 206 is an assembly having a top member 401 and a bottom member 402.

Figure 5:
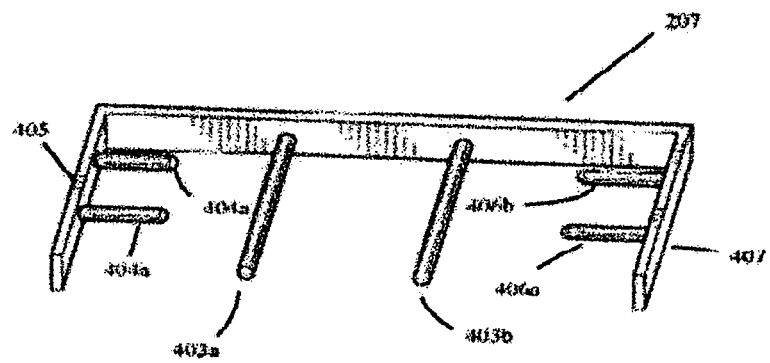
FIG. 5 shows a close-up perspective view of a preferred embodiment of a pole rack in accordance with an embodiment of the invention.

With respect to FIG. 5, a viewer may perceive that the pole rack 207 has at least two poles 403 a and 403 b extending from the middle of the pole rack 207, and at least two poles 404 a and 404 b from the left side 405 of the pole rack 207 and at least two poles 406 a and 406 b from the right side 407 of the pole rack 207.

Figure 3:
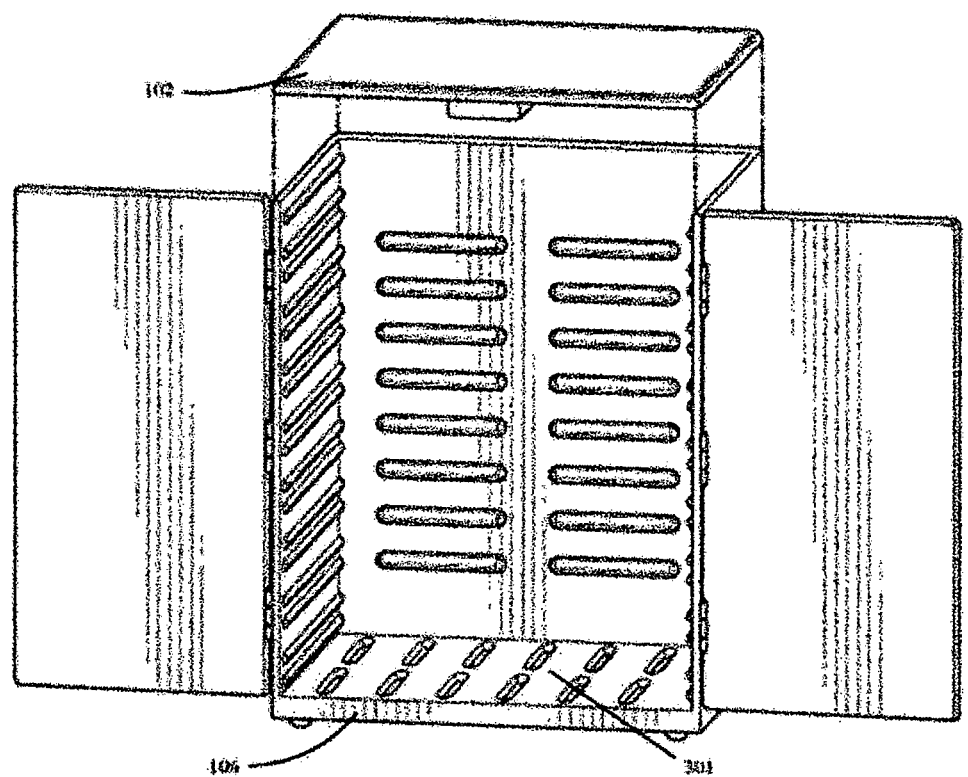
FIG. 3 shows perspective view of an embodiment of a drying storage rack in accordance with an embodiment of the invention.

With regards to FIG. 3, a perspective view of an embodiment of the drying storage unit 100 in accordance with an embodiment of the invention is shown. In the embodiment depicted, a viewer may perceive that the top member 102 of the drying storage unit 100 is removable. A viewer may also perceive that the bottom member 106 of the inner compartment 201 has openings 301 to allow any water to escape from the inner compartment 201 as culinary utensils are drying.

Figure 6:
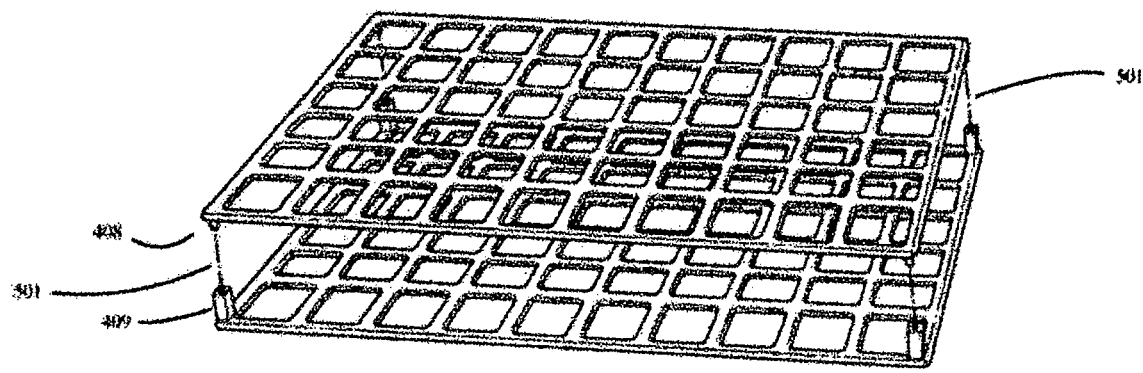
FIG. 6 shows a close-up perspective view of a preferred embodiment of a drying storage rack in accordance with an embodiment of the invention.

With respect to FIG. 6, a close-up perspective view of the adjustable drying rack 206 is shown. In the embodiment depicted, a viewer may perceive that the male post 408 of the top member 401 of the drying rack 206 and the female pose 409 of the bottom member 402 of the drying rack 206 assembly fit together 501.

In the embodiment shown in FIGS. 4a and 4b, a viewer may perceive one or more male posts 408 extending in a perpendicular direction from the corners of the top member 401 of the drying rack 206 and one or more female posts 409 extending in a perpendicular direction from the corners of the bottom member 402 of the drying rack 206.

With respect to FIG. 5, a viewer may also perceive that the pole rack 207 has at least two poles 403a and 403b extending from the middle of the pole rack 207, and at least two poles 404a and 404b from the left side 405 of the pole rack 207 and at least two poles 406a and 406b from the right side 407 of the pole rack 207.

With respect to FIG. 6, a close-up perspective view of the adjustable drying rack 206 is shown. In the embodiment depicted, a viewer may perceive that the male post 408 of the top member 401 of the drying rack 206 and the female pose 409 of the bottom member 402 of the drying rack 206 assembly fit together 501.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. A drying storage unit to enable a user to properly dry a high-use item in a convenient location, the dry storage unit comprising:
   a cabinet-style storage compartment, comprising:
   a) a top side;
   b) a left side and a right side each extending downwardly from opposite ends of the top side;
   c) a bottom side extending below the left and right sides that is adapted to be disposed above a floor and rests on a plurality of short legs;
   d) a rear side extending between the left side and right side
   e) a door opening outwardly that is hingedly attached to left side and right side; and
   f) an inner compartment defined between the top side, left and right sides, bottom side, and rear side, wherein
   the inner compartment houses a plurality of shelving brackets on the left side, right side and on the rear side;
   at least one adjustable drying rack and at least one pole rack each resting on the shelving brackets;
   the at least one adjustable drying rack having a top member and a bottom member that are secured to each other with at least two corner posts to form a bin so as to receive a drying mat or paper towels;
   the pole rack having at least one pole extending in different directions from each of the right, left, and rear inner edges of the pole rack; and
   a plurality of openings is provided through the bottom side to allow water to drain.

2. The drying storage unit of claim 1, wherein the top side is removable.

3. The drying storage unit of claim 1, wherein the at least one adjustable drying rack is configured as a two piece design such that the top member is adapted to be removed and the bottom member can be used to put a plurality of items thereon.

4. The drying storage unit of claim 1, wherein the high-use items are kitchen utensils used daily or several times a day.

* * * * *